(12) United States Patent
Rohatschek

(10) Patent No.: US 7,864,078 B2
(45) Date of Patent: Jan. 4, 2011

(54) METHOD AND DEVICE FOR DECODING A SIGNAL

(75) Inventor: Andreas-Juergen Rohatschek, Wernau/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/063,392

(22) PCT Filed: Aug. 7, 2006

(86) PCT No.: PCT/EP2006/065111

§ 371 (c)(1),
(2), (4) Date: Apr. 6, 2010

(87) PCT Pub. No.: WO2007/017491

PCT Pub. Date: Feb. 15, 2007

(65) Prior Publication Data

US 2010/0219992 A1     Sep. 2, 2010

(30) Foreign Application Priority Data

Aug. 8, 2005    (DE) ........................ 10 2005 037 263

(51) Int. Cl.
*H03M 7/34*     (2006.01)
(52) U.S. Cl. .......................... 341/51; 375/238; 375/354
(58) Field of Classification Search ............. 341/50–90; 375/260, 238, 354, 355, 368, 356
See application file for complete search history.

(56) References Cited

U.S. PATENT DOCUMENTS

| | | | | |
|---|---|---|---|---|
| 5,412,698 | A | | 5/1995 | Van Brunt et al. |
| 5,684,838 | A | * | 11/1997 | Kanda et al. ................. 375/342 |
| 6,653,968 | B1 | * | 11/2003 | Schneider .................... 341/178 |
| 7,106,793 | B2 | * | 9/2006 | Spichale ..................... 375/238 |
| 7,233,618 | B2 | * | 6/2007 | Korotkov .................... 375/238 |
| 7,639,765 | B2 | * | 12/2009 | Suzuki et al. ............... 375/354 |

FOREIGN PATENT DOCUMENTS

| | | |
|---|---|---|
| DE | 34 17 358 | 11/1985 |
| DE | 43 04 913 | 8/1994 |
| EP | 0 562 183 | 9/1993 |
| EP | 1 335 520 | 8/2003 |

OTHER PUBLICATIONS

International Search Report, PCT International Patent Application No. PCT/EP2006/065111, dated Nov. 14, 2006.

* cited by examiner

*Primary Examiner*—Lam T Mai
(74) *Attorney, Agent, or Firm*—Kenyon & Kenyon LLP

(57) ABSTRACT

A method and a device for decoding a signal transmitted via at least one transmission line of a data transmission system, in a user of the data transmission system receiving the signal. Instead of at discrete instants, as currently done, sampling at a specific sampling instant does not take place. To this end, a potential-edge position (PEP) for an imminent edge is estimated first. Then, given n-fold oversampling, maximally n sampling values before the PEP and maximally n sampling values after the PEP are determined and compared with previously recorded and stored sampling values. The stored sampling values are preferably stored in an edge-acceptance vector (EAV) and correspond to an edge change of the signal to be decoded at a particular point in time. Preferably not all detected 2n sampling values are compared to the content of the EAVs, but the comparison is limited to a portion, combined to a sensitivity range, of the 2n sampling values of each EAV.

36 Claims, 16 Drawing Sheets

Fig. 3a

KFP
↓
XX111111111111XX
XX011111111111XX
XX001111111111XX
XX000111111111XX
XX000011111111XX
XX0000001111111X
XX000000011111XX
XX000000001111XX
XX000000000111XX
XX000000000011XX
XX000000000001XX

Fig. 4a

KFP
↓
XX111111111111XX
XX011111111111XX
XX001111111111XX
XX000111111111XX
XX000011111111XX

Fig. 5a

XXXXXX1110XXXXXX
XXXXXX1100XXXXXX
XXXXXX1000XXXXXX
XXXXXX0000XXXXXX

Fig. 3b

| | vectors rising |
|---|---|
| VR01 | 01XXXXXXXXXXXXXX |
| VR02 | X01XXXXXXXXXXXXX |
| VR03 | XX01XXXXXXXXXXXX |
| VR04 | XXX01XXXXXXXXXXX |
| VR05 | XXXX01XXXXXXXXXX |
| VR06 | XXXXX01XXXXXXXXX |
| VR07 | XXXXXX01XXXXXXXX |
| VR08 | XXXXXXX01XXXXXXX |
| VR09 | XXXXXXXX01XXXXXX |
| VR10 | XXXXXXXXX01XXXXX |
| VR11 | XXXXXXXXXX01XXXX |
| VR12 | XXXXXXXXXXX01XXX |
| VR13 | XXXXXXXXXXXX01XX |
| VR14 | XXXXXXXXXXXXX01X |
| VR15 | XXXXXXXXXXXXXX01 |
| VRrec | 1111111111111111 |

Fig. 5b

| | vectors falling |
|---|---|
| VF01 | XXXX10XXXXXXXXXX |
| VF02 | XXXXX10XXXXXXXXX |
| VF03 | XXXXXX10XXXXXXXX |
| VF04 | XXXXXXX10XXXXXXX |
| VF05 | XXXXXXXX10XXXXXX |
| VF06 | XXXXXXXXX10XXXXX |
| VF07 | XXXXXXXXXX10XXXX |
| VFrec | 0000000000000000 |

Fig. 4b

W: number of data bits last byte having value "1"
$T_{sys}$: systematic (=static) asymmetry
$T_{sto}$: stochastic asymmetry
i: measuring result

METHOD AND DEVICE FOR DECODING A SIGNAL

FIELD OF THE INVENTION

The present invention relates to a method for decoding a signal, transmitted via at least one transmission line of a data transmission system, in a user of the data transmission system receiving the signal. Furthermore, the present invention relates to a method for decoding a signal. In addition, the present invention relates to a system for transmitting data. Furthermore, the present invention relates to a user of a data transmission system. Finally, the present invention also relates to a communications controller of a user of a data transmission system.

BACKGROUND INFORMATION

The networking of control units, sensor systems and actuator systems with the aid of a communications system and a communication connection, for instance in the form of a bus system, has increased drastically in recent years in the manufacture of modern motor vehicles or also in machine construction, especially in the field of machine tools, and in the automation field as well. Synergistic effects can be achieved by distributing functions to a plurality of control units. This is referred to as distributed systems.

The communication between various users of such a data transmission system is increasingly being implemented via a bus system. The communication traffic on the bus system, access and receiving mechanisms, as well as error handling are regulated by a protocol. One known protocol is, for instance, the FlexRay protocol, which is currently based on the FlexRay protocol specification v2.1. FlexRay is a fast, deterministic and error-tolerant bus system, especially for use in motor vehicles. The FlexRay protocol operates according to the principle of time division multiple access (TDMA), in which the users or the messages to be transmitted are assigned fixed time slots during which they have exclusive access to the communications link. The time slots repeat at a fixed cycle, so that the instant at which a message is transmitted via the bus can be predicted exactly, and the bus access takes place deterministically.

To optimally utilize the bandwidth for the message transmission on the bus system, FlexRay subdivides the cycle into a static and a dynamic portion. The fixed time slots are in the static portion at the beginning of a bus cycle. In the dynamic part the time slots are assigned dynamically. Therein, the exclusive bus access is always provided for only a short time, for the duration of at least one so-called mini slot.

The time slot is lengthened by the necessary time only if a bus access takes place within a minislot. Consequently, bandwidth is used up only if it is actually needed. In the process, FlexRay communicates via one or two physically separate lines at a data rate of maximally 10 Mbit/sec in each case. Of course, it is also possible to operate FlexRay at lower data rates. The two channels correspond to the physical layer, in particular of the so-called OSI (open system interconnection) layer model. They are used chiefly for the redundant and therefore error-tolerant transmission of messages, but are also able to transmit different messages, whereby the data rate would then double. It is also possible that the signal transmitted via the transmission lines results from the difference of signals transmitted via the two lines. The physical layer is designed such that it allows an electrical but also an optical transmission of the signal(s) via the line(s) or a transmission in some other manner.

To realize synchronous functions and to optimize the bandwidth by small intervals between two messages, the users in the communications network require a common time base, which is referred to as global time. For the clock synchronization, synchronization messages are transmitted in the static portion of the cycle, and the local clock time of a user is corrected with the aid of a special algorithm according to the FlexRay specification in such a way that all local clocks run in synchronism with a global clock.

In the transmission of data or messages via such a bus system, pulses are distorted because high-to-low or low-to-high edges are delayed to different degrees on the transmission path. If the transmitted pulse is sampled repeatedly (for instance, n-times per bit) in the receiver using the sample clock (the so-called sampling rate) available there, then the position of the sampling point, i.e., the selection of precisely one of these n sampling values, decides whether the datum is sampled correctly or incorrectly. This is difficult especially when the sampling instant refers to an edge of the signal and also analyzes a plurality of binary data values (bits) of the transmitter relative thereto, over many periods of the sampling period. In addition to a pulse distortion, the clock frequency deviation between transmitter and receiver also has an effect in this context. It has become apparent that the rigid specification of the sampling instant without considering the asymmetrical delays on the different transmission paths leads to problems.

Because of the rigid selection of the sampling instant per bit (for instance, at n=8 sampling values per bit, to 5, in the middle of a bit), both the influence of the asymmetrical distortion and the frequency deviation as well as the additional time discretization by the sampling pose a problem and place high demands on the transmission channel. Increasing the edge steepness so as to reduce the asymmetrical delays would indeed be advantageous for the timing, but on the other hand would require technically more sophisticated and thus more expensive components and, in addition, could have an adverse effect on the EMC response of the data transmission system. However, depending on the pulse distortion, there is the risk of evaluating the wrong datum either on the one or the other bit boundary.

When realizing FlexRay data transmission systems, in particular in the case of complex systems that include a plurality of star couplers and passive networks, it has also been shown that the asymmetrical delay times that occur there are so great that they exceed a time budget specified by the FlexRay protocol. According to the FlexRay protocol, a sampling counter is synchronized, i.e., reset, in response to a falling BSS (byte start sequence) edge. Sampling occurs at a counter reading of 5. In an eight-fold oversampling as it is currently provided in FlexRay, three sampling cycles thus remain between the sampling instant (fifth sampling value) and the eighth sampling value, which, given a communications controller cycle of 80 MHz, thus correspond to 12.5 ns in each case and therefore to a time budget of 37.5 ns in total. This time budget is actually provided to compensate for asymmetrical delays due to the difference between the falling and rising edge steepness. However, as may be the case in complex network topologies, if the asymmetrical delay exceeds the provided time budget, then an incorrect value will be determined in a sampling at the fifth sampling cycle (counter reading of the cycle counter at 5), since the particular bit that should actually have been sampled was already available at an earlier instant due to the asymmetrical delay and is no longer present because of the early edge change. An analogous treatment applies to an asymmetrical delay to retard. In that case, a time budget of four sampling cycles is available, which corresponds to 50 ns. Exceeding the time budget in the advance or retard direction results in decoding errors, which means that incorrect data are received.

These decoding errors may actually be detected by suitable error detection algorithms, so that renewed transmission of the bit or the entire data frame may be initiated. A cyclic redundancy check (CRC), for example, may be used as error detection algorithm. However, if the error detection algorithm responds too frequently, there is the disadvantage of reduced availability of the data transmission system.

In summary, it may be said that the FlexRay protocol sets down stipulations that the physical layer, at least with complex network topologies, is unable to meet.

SUMMARY

Example embodiments of the present invention address this contradiction and provide a possibility for transmitting data via the data transmission system at a high transmission rate, with high reliability and high availability of the data transmission system, and the ability of decoding the data in the receiving user.

To achieve this, based on the method of the type mentioned in the introduction, it is provided that a position for a potential edge change of the signal present at the receiving user be determined without taking asymmetrical delays into account; the applied signal is sampled at least one sampling period in front of the position for a potential edge change, and/or at least one sampling period after the position for a potential edge change; the sampled values of the applied signal are compared to corresponding values that were determined previously and stored, and the value of a bit received between two potential edge changes is determined as a function of the result of the comparison.

A difference to conventional arrangements is that sampling no longer takes place at a specific sampling instant, neither at a fixedly specified nor at a variable sampling instant. Instead, the sampling values available due to an n-fold oversampling, or a subset of these sampling values, is/are utilized to determine the value of the instantaneous bit. A plurality of sampling values is utilized to determine the applied bit value in order to be able to make an unambiguous, reliable statement regarding the bit value. In this manner the time budget of asymmetrical delays available in the data transmission system may be increased considerably, i.e., nearly doubled.

Example embodiments of the present invention are described by way of example based on a FlexRay data transmission system. However, this should not be understood as a restriction. Example embodiments of the present invention may be used for many different types of data transmission systems and is easily transferable to comparable systems.

According to example embodiments of the present invention, sampling is implemented early enough in advance of and following a possible edge position. Sampling does not take place at a specific sampling position, but the location of an edge is detected. In an n-fold oversampling, an edge change may take place at the periodicity of n sampling cycles. The so-called potential edge position (PEP) denotes the position of a potential edge change without stochastic or systematic influence of an EMC jitter or some other asymmetrical delay. If the decoding is synchronized to a falling edge, for instance to the falling BSS (byte start sequence) edge, the nominal position of the rising potential edge change is affected by asymmetrical delay times. However, the nominal position of the falling potential edge change is not affected by systematic, asymmetrical delay times. Only stochastic influences occur with falling potential edge changes, which are detectable as EMC jitter or EMC component of the asymmetrical delay. Accordingly, in a synchronization to a rising edge, only the falling potential edge changes are affected but not the rising potential edge changes. To detect an edge change, sampling takes place a maximum of n sampling cycles prior to and maximally n sampling cycles following the nominal edge position. N corresponds to the value n of the oversampling. However, the number of sampling cycles before and/or after the nominal potential edge position may even be reduced down to 1 given the stipulation and consideration of corresponding marginal conditions. That is to say, a potential edge change is measured and characterized by up to 2n successive sampling values.

The range in a sequence of successive sampling values in which a check for an actual edge change takes place is known as sampling range or also sensitivity range. The actual edge change is shifted relative to the potential edge position due to asymmetrical delay times and EMC jitter. Given 8-fold oversampling, the sensitivity range of a rising edge lies in an interval between six sampling periods before and six sampling periods after the nominal potential edge position. Given 8-fold oversampling, the sensitivity range of a falling edge lies in the interval between two sampling periods before and two sampling periods after the nominal potential edge position. Of course, the indicated numbers for the number of sampling periods before and after the nominal potential edge position are exemplary values only. They may be varied virtually at random for different oversamplings or while specifying and considering specific marginal conditions. Sampling values outside of the sensitivity range are not considered, but may be recorded.

An edge acceptance vector is an ordered combination of the 2n sampling values of a potential edge change. For a particular type of edge (rising or falling) there are a plurality of edge acceptance vectors. The bit that is inverse to the last bit (if a rising edge is expected, the current bit is zero and the bit inverse thereto would be one) must be included at least once in each one of the edge acceptance vectors. For this reason, a vector having only zeroes is not allowed for rising edges. The number of required edge acceptance vectors is based on the maximally tolerable asymmetrical delay of the entire causal loop and on the degree of oversampling.

To detect a rising edge, a subset is selected from the set of determined edge acceptance vectors, which allows the detection and assignment of a rising edge to its potential edge position in an unambiguous manner. The trend of the asymmetrical delay (given uncertainty of the EMC influence) is advantageously determined by measuring the delay of one or a plurality of changes, either required in the protocol or occurring randomly, of rising and falling edge. The edge acceptance vectors utilized for the evaluation are selected such that they expect an edge change around the determined tendential position. In particular when decoding successive zeroes, the selected subset must ensure that no ambiguity will be possible in the edge detection. An ambiguity would arise if a detected rising edge could be shifted both from the potential edge position (i) to retard as well as from the potential edge position (i+1) to advance, and two edge acceptance vectors would be correct (one for evaluation instant BEW (i) and one for BEW (i+1)).

Measuring the delay of at least one change of rising and falling edge, prescribed by the protocol, results in an expected edge change at a certain position in front of or following the potential edge position within the sampling periods. Then, a subset of the edge acceptance vectors is selected as edge acceptance vector set. For one, the subset encompasses the edge acceptance vector by which an edge change at the expected edge change position is able to be detected. In addition, the subset includes a particular number of edge acceptance vectors before this first vector and following this first vector. The number of additional edge acceptance vectors before and after this vector depends on the magnitude of the EMC component in the asymmetrical delay. For instance, if one may assume that the EMC influence on the delay is smaller than two sampling periods, then two additional edge acceptance vectors before and after the first vector will suffice. In this case the edge acceptance vector set would be made up of five edge acceptance vectors.

For expected falling edges, an edge acceptance vector set results accordingly, the sensitivity range and thus the number of sampling values to be taken into account within the edge acceptance vectors being lower than in an expected rising edge.

Bits arriving first are sampled first in the method. Prior to the sampling of a bit, the potential following edge is specified based on the detected value of the previously sampled bit, and the correct edge acceptance vector set is determined based on this specification. If the last bit was a one, then the corresponding edge acceptance vector set for falling edges is selected. If the last bit was a zero, then the corresponding edge acceptance vector set for rising edges is selected.

Whenever the 2n sampling values were detected that are available in an n-fold oversampling, the evaluation of the detected sampling values and thus the determination of the corresponding bit value takes place at evaluation instants BEW. As already elucidated earlier, the detection of the sampling values and the evaluation may also be restricted to the sampling values of the sensitivity range. It would also be possible to begin with the evaluation already when the limit of the sensitivity range has been reached since the sampling values outside the sensitivity range are not relevant to the evaluation.

If it turns out in the evaluation that the memory of the sampling values includes at least one vector that is part of the set of selected edge acceptance vector set, then the associated edge is considered detected and the associated bit value is determined. Otherwise, no edge has been detected, and it is assumed that the instantaneous bit is the same as the predecessor bit.

To realize the method according to example embodiments of the present invention, the users of the data transmission system, but at least the receiving users, advantageously include two memories, which may be written to in alternation. For instance, the use of 16 bit memories, which are controlled by two counters in the value range of up to 16, is possible, the counters being incremented in each sampling period.

To realize the method, one or a plurality of the following marginal conditions may be specified.

The filter effect of a majority voting machine must be taken into account. In determining the maximally allowed time budget for the asymmetrical delay times, the time discretization error of the sampling must be taken into consideration. In particular the edge acceptance vector that, in addition to the "don't cares"="X", includes zeros and/or ones exclusively, is used to increase the robustness of the method.

According to example embodiments of the present invention, edge change and the position of the detected changes in relation to the counter reading may be detected and ascertained also without the use of vectors. Determining the position of an edge change allows a reliable and safe evaluation of the instantaneous bit value. The sensitivity ranges may deviate from the indicated examples. Instead of the eightfold oversampling mentioned here, any other n-fold oversampling may be selected as well. Instead of a synchronization to the falling edge, a synchronization to a rising edge may be implemented. The number of bits to be sampled after the synchronization edge varies. The evaluation of the sampled values allows the diagnosis of implausible combinations as input bit errors (such as oscillating input bit streams). Evaluation instant BEW need not necessarily take place after 2n monitored sampling values, but may already take place after all sampling values of the sensitivity range have been monitored, even before all 2n sampling values were monitored (for instance, after i sampling values, with i=1 ... (2n−1)), since the sampling values outside the sensitivity range are irrelevant for the evaluation. The majority voting requires a minimum duration of the one or zero phase of three sampling periods. As an alternative, the majority voting could also be reduced to two consecutive edges (rising and falling) of the sampling period, or filtering could be achieved by suitable selection of edge acceptance vectors.

Additional features and aspects of example embodiments of the present invention are described below with reference to the appended Figures.

BRIEF DESCRIPTION OF THE DRAWINGS

FIG. 3a illustrates a first example for the configuration of edge acceptance vectors for rising edges;

FIG. 3b illustrates a second example for the configuration of edge acceptance vectors for rising edges;

FIG. 4a illustrates a subset of the edge acceptance vectors from FIG. 3a;

FIG. 4b illustrates subsets of the edge acceptance vectors from FIG. 3b;

FIG. 5a illustrates a first example for the configuration of edge acceptance vectors for falling edges;

FIG. 5b illustrates a second example for the configuration of edge acceptance vectors for falling edges;

DETAILED DESCRIPTION

The networking of control devices, sensor systems and actuator systems with the aid of a communications system and a communications link such as a bus system, has increased drastically in recent years in the construction of modern motor vehicles or also in machine construction, especially in the field of machine tools, and in automation as well. In this context, synergistic effects may be achieved by distributing functions to a plurality of control devices. These are referred to as distributed systems.

The communication between various users of such a data transmission system is increasingly being implemented via a bus system. The communication traffic on the bus system, access and receiving mechanisms, as well as error handling are regulated by a protocol. One known protocol is, for instance, the FlexRay protocol, which is currently based on the FlexRay protocol specification v2.1. FlexRay is a rapid, deterministic and error-tolerant bus system, especially for the use in motor vehicles. The FlexRay protocol operates according to the method of time division multiple access (TDMA), in which the users or the messages to be transmitted are assigned fixed time slots in which they have an exclusive access to the communications link. In this context, the time slots repeat in a fixed cycle, so that the instant at which a message is transmitted via the bus can be predicted exactly, and the bus access takes place deterministically. FlexRay communicates via one or two physically separate lines at a data rate of maximally 10 Mbit/sec in each case. Of course, it is also possible to operate FlexRay at lower data rates. The two channels correspond to the physical layer, in particular of the so-called OSI (open system interconnection) layer model. They are used chiefly for the redundant and therefore error-tolerant transmission of messages, but are also able to transmit different messages, whereby the data rate would then double. It is also possible that the transmitted signal results from the difference of the two signals transmitted via the lines, as differential signal. The signal transmission via the physical layer may be implemented electrically, optically or in any other manner.

To realize synchronous functions and to optimize the bandwidth by small intervals between two messages, the users in the communications network need a common time base, which is known as global time. For the clock synchronization, synchronization messages are transmitted in the static portion of the cycle, and the local clock time of a user is corrected with the aid of a special algorithm according to the FlexRay specification in such a way that all local clocks run in synchronism with a global clock.

Figure 14A:
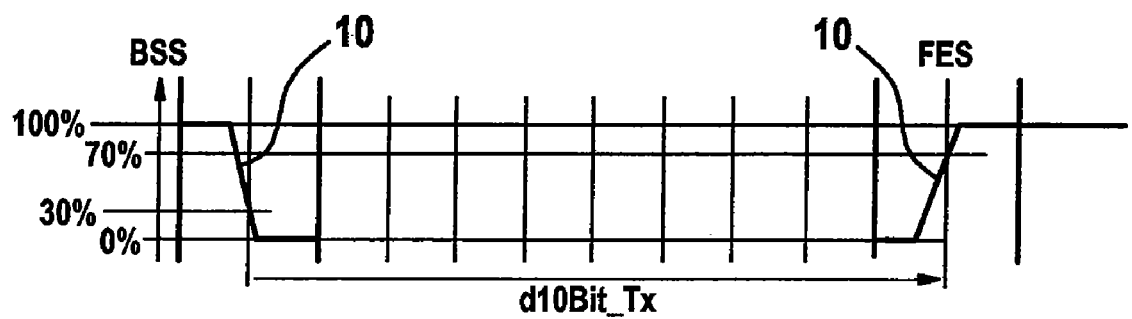
FIG. 14a illustrates a signal characteristic in the case of a falling and rising edge in a data transmission system.
Figure 14B:
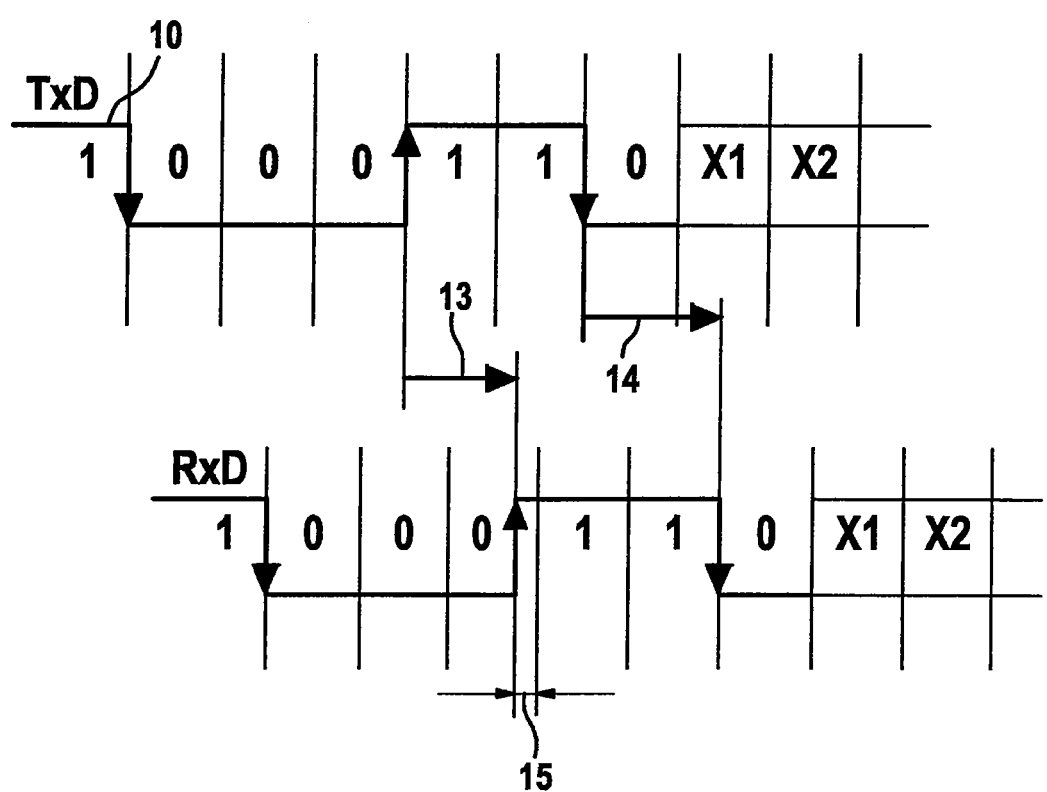
FIG. 14b illustrates characteristics of a signal transmitted by a transmitting user and received by a receiving user.

FIG. 14a shows that signals in the region of edge changes from high to low or from low to high have no ideal rectangular characteristic, but a slanted, ramp-like characteristic. It can be seen that the gradient of the falling edge and the rising edge are of different magnitude. This difference causes a difference in the resulting delays for rising and falling edges (cf. FIG. 14b). An asymmetrical delay 15 results as a function of the difference in the delays for rising edges 13 and falling edges 14. In FIG. 14b, the characteristic of emitted signal 10 is shown on top, and the characteristic of received signal 10 is shown at the bottom. Delays 13, 14 concern the difference in the corresponding edges between emitted signal TxD and received signal RxD.

Figure 15:
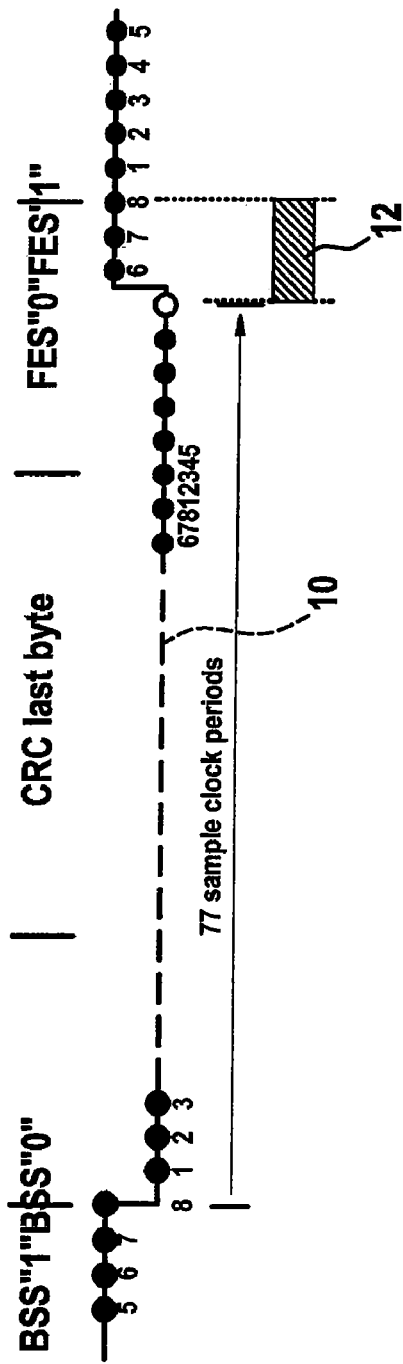
FIG. 15 illustrates a conventional functioning method for decoding a signal at the fifth sampling point.

In the transmission of data or messages via a bus system having such delays, pulses are distorted because high-to-low or low-to-high edges are delayed to different degrees on the transmission path. conventionally, if the transmitted pulse is sampled repeatedly in the receiver (for instance, eight times per bit) using the sampling period cycle (the so-called sampling rate) available there, then the position of the sampling point, i.e., the selection of precisely one of these eight sampling values, decides whether the datum is sampled correctly or incorrectly. This will be elucidated in greater detail in the following text based on FIGS. 15 and 16.

A signal to be decoded is denoted by reference numeral 10. The decoding is synchronized to the falling BSS (byte start sequence) edge. At the instant of synchronization, a sampling counter begins running and is reset whenever counter reading 8 is reached. In the examples from FIGS. 15 and 16, the signal is sampled at the fifth sampling point in each case. The rigid specification of the sampling instant, without consideration of the asymmetrical delays on different transmission paths, causes problems.

Due to the rigid selection of the sampling instant per bit (for instance, with eight sampling values per bit, to the $5^{th}$ sampling value, in the middle of a bit), both the influence of the asymmetrical delay and the frequency deviation and the additional time discretization by the sampling present a problem, placing high demands on the transmission channel. Increasing the edge steepness in order to reduce the asymmetrical delays would indeed be advantageous for the timing, but on the other hand would also require technically more sophisticated and thus more expensive components and, in addition, would have an adverse effect on the EMC response of the data transmission system. However, depending on the pulse distortion, there is the risk of evaluating the incorrect datum either on one or the other bit boundary. This becomes clear in FIGS. 15 and 16.

Ideally, the pending edge change should actually take place precisely at counter reading 8 between FES "0" and FES "1". However, due to the asymmetrical delays it is shifted in the advance direction in FIG. 15, to such an extent that the edge change occurs precisely between the fifth and sixth sampling value. This is non-critical in this example insofar as the sampling instant still lies before the edge change, and the bit (0) preceding the edge change is able to be decoded correctly.

Figure 16:
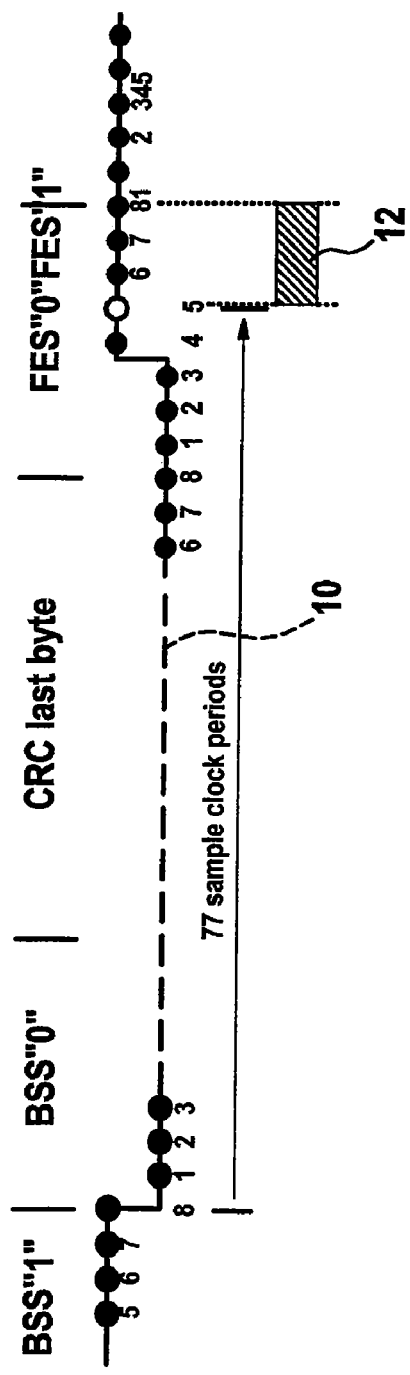
FIG. 16 illustrates a conventional method for decoding a signal at the fifth sampling point with a decoding error.

In FIG. 16 the edge change is shifted even further in the advance direction due to greater asymmetrical delays, so that it now lies before the sampling instant between the third and the fourth sampling value. Now, it is no longer possible to detect the correct bit value (0). Instead, an incorrect bit value (1) is detected at the sampling instant at the fifth sampling value; a decoding error occurs.

When realizing FlexRay data transmission systems, in particular in the case of systems with relatively complex topologies that encompass a plurality of star couplers and passive networks, it has also been found that the asymmetrical delay times that occur there are so high that they exceed a time budget specified by the FlexRay protocol. According to the FlexRay protocol, the sampling counter is synchronized, i.e., reset, with a falling BSS (byte start sequence) edge. Sampling occurs at a counter reading of 5. In an eight-fold oversampling as it is currently provided in FlexRay, three sampling cycles therefore remain between the sampling instant (fifth sampling value) and the eighth sampling value; given a communications controller cycle of 80 MHz, these amount to 12.5 ns in each case, the sum of these sampling cycles thus corresponding to a time budget 12 of 37.5 ns. This time budget 12 is actually provided to compensate for asymmetrical delays caused by the difference between the falling and rising edge steepness. However, if the asymmetrical delay exceeds the provided time budget 12, as may happen in the case of complex network topologies (cf. FIG. 16), then this will result in an incorrect value being ascertained in a sampling in the fifth sampling cycle (counter reading of sampling counter at 5).

Figure 17:
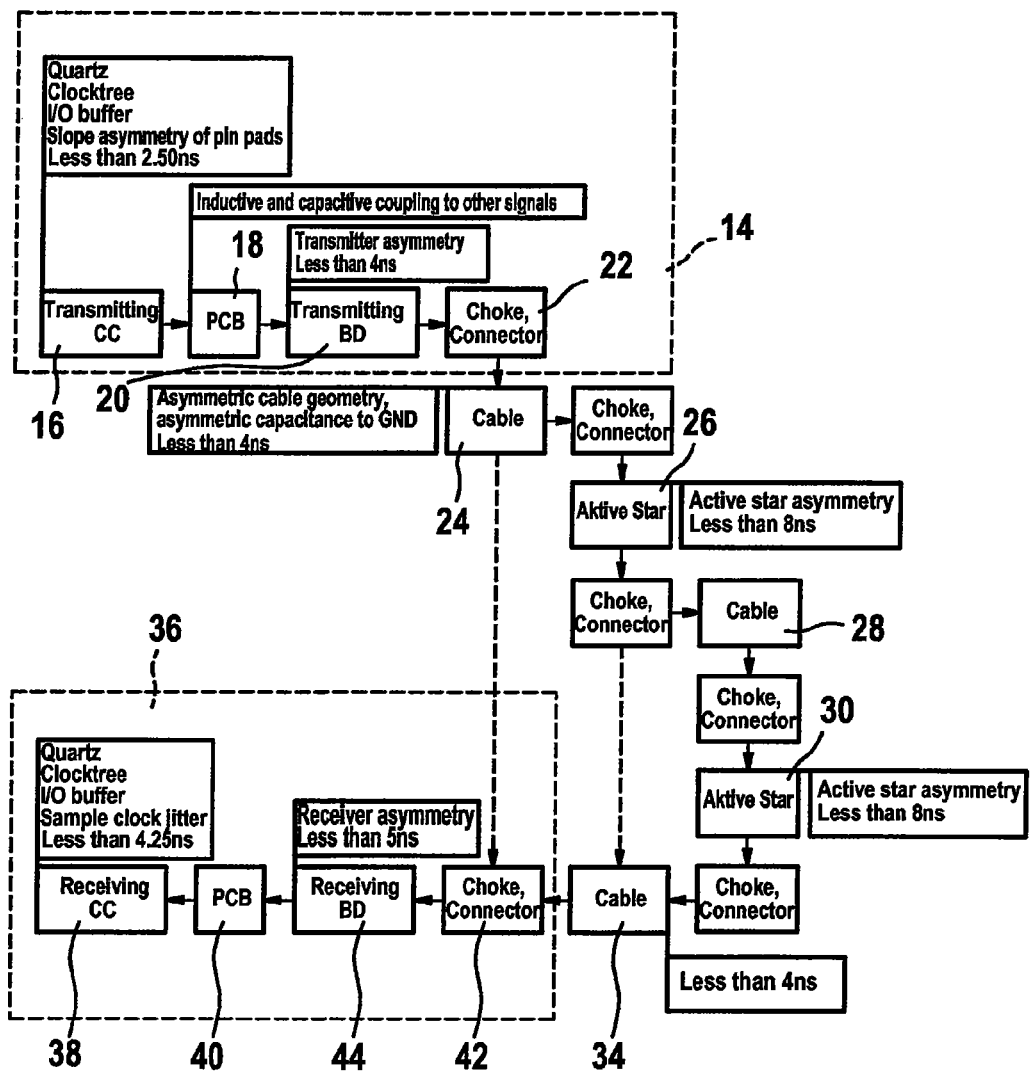
FIG. 17 illustrates one example for a signal chain of a data transmission system with corresponding exemplary values for the resulting asymmetrical delay without the EMC component.

A data transmission path in a slightly more complex network topology is shown in FIG. 17 by way of example, together with the corresponding resulting delay times for the asymmetrical delay. The data transmission path includes a transmitting user 14 having a communications controller (CC) 16, a printed circuit board having circuit traces and components (PCB) 18, and a transmitter. The transmitter includes a bus driver (BD) 20 and a termination element (common mode choke CMC) 22. Via a first passive network 24, which is made up of connecting lines, transmitting user 14 is connected to a first active star node 26, which includes two bus drivers, among others.

Via additional connecting lines 28, first star node 26 is in connection with a second active star node 30, which likewise includes two bus drivers. Via a second passive network 34, star node 30 is connected to a receiving user 36, having a communications controller (CC) 38, a printed circuit board (PCB) 40, and a receiver. The receiver includes a termination element (CMC) 42, and a bus driver (BD) 44.

The corresponding estimated, modeled and/or calculated time data for the asymmetrical delay (without the EMC component) are indicated for the various components and must be added up to determine the entire asymmetrical delay. Given assumed numerical values for extensive network topologies, an asymmetrical delay of approximately 72 ns results. This is above the previously determined time budget of approx. 37.5 ns. As a result, the conventional decoding method can no longer function properly at certain instants in the network topology from FIG. 17 when maintaining the desired high data rate of approximately 10 Mbit/sec.

In summary, it may be said that the FlexRay protocol makes demands that the physical layer, at least in the case of complex network topologies, is unable to satisfy. Example embodiments of the present invention are able to remedy this.

According to example embodiments of the present invention, a decoding method is provided in which a signal is not sampled at a specific instant (such as when the sampling counter reads 5). In a first step, an estimation is performed as to where a possible edge position of the signal to be decoded might be located. Within the scope of the estimation, the interval between at least one mandatory sequence of rising and falling edges prescribed in the protocol, or a random sequence of rising and falling edges is measured with the aid of a counter, and the systematic component of the asymmetrical delay is determined therefrom. Then, sampling takes place sufficiently before and sufficiently after the possible edge position. The sampled values are compared with previously recorded sampling values, and the corresponding bit value is determined on the basis of the comparison. One set of a plurality of sampling values was recorded and stored for a position of an edge change in each case. That is to say, when the sampled values agree with a specific stored set of sampling values, then it is assumed that the edge change has occurred at the position that corresponds to the set of sampling values. The use of the method of example embodiments of the present invention makes it possible to take the characteristics of the transmission channel into account. It is especially robust with regard to asymmetrical delays.

The method according to example embodiments of the present invention will be elucidated in the following text with the aid of the FlexRay protocol. The method may be used for any other protocol as well.

Figure 1:
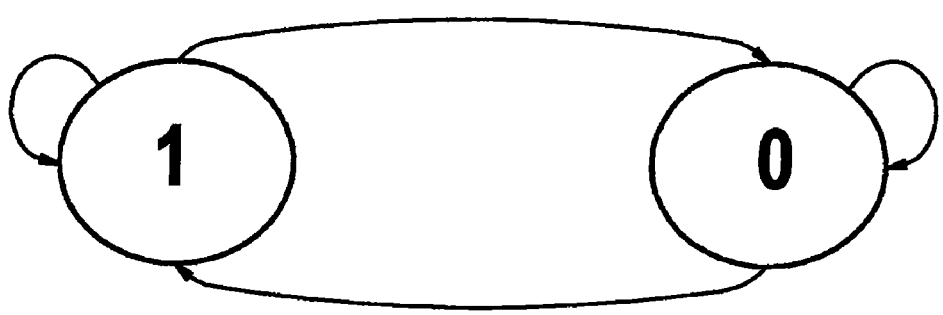
FIG. 1 is a transition diagram of bits received in a data transmission system according to an example embodiment of the present invention.

In the method of example embodiments of the present invention, first the various possible subsequent states are specified with the aid of the transfer diagram shown in FIG. 1 and based on a particular state of received bits. A 0 must be followed by a 0 or a 1. A 1 is followed by a 1 or a 0. A rising edge may follow only after a 0. A falling edge may follow only after a 1. It is impossible for a rising edge to follow a 1, or for a falling edge to follow a 0.

Figure 6:
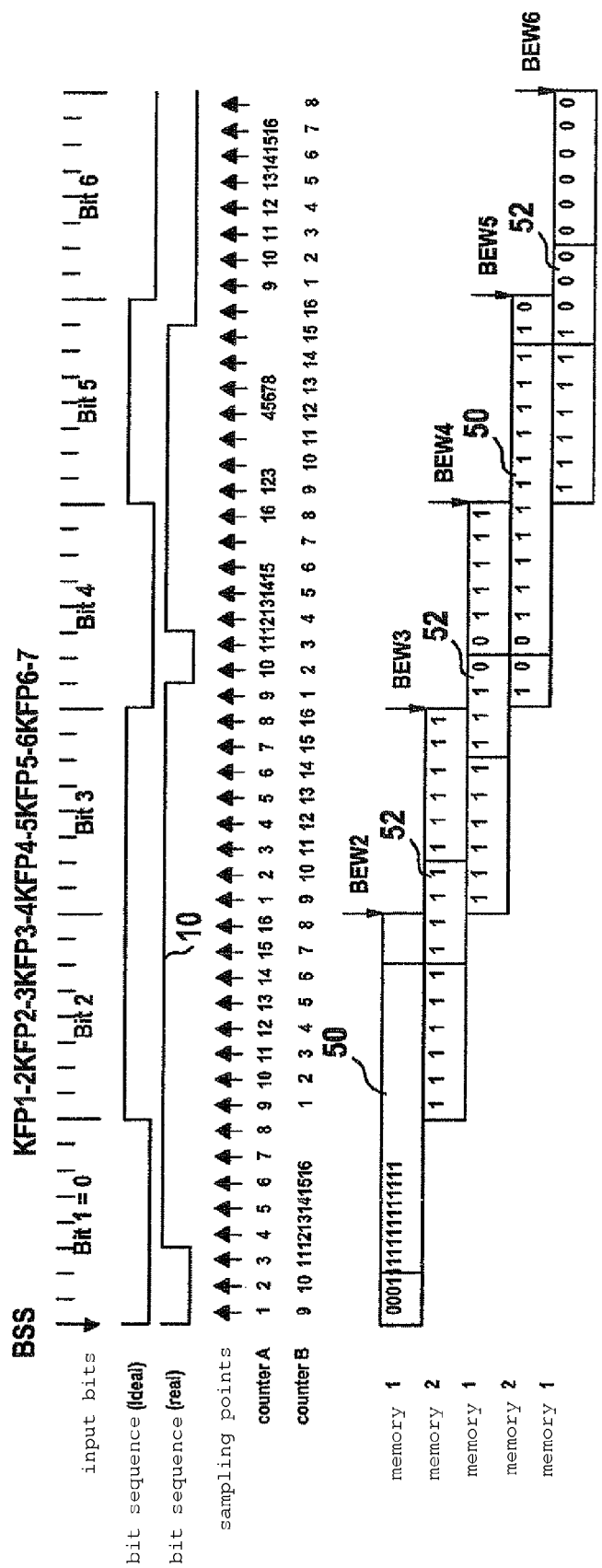
FIG. 6 illustrates a first example for the realization of the method according to an example embodiment of the present invention for a first exemplary bit sequence.

The decoding method is elucidated in greater detail in the following text with the aid of FIG. 6. According to FlexRay protocol specification 2.1, the synchronization takes place to the falling BSS edge. However, it is of course also possible to synchronize to rising edges. When synchronizing to the falling BSS edge, a first counter A is set to 1, and a second counter B is set to 9.

The method may also be realized by one counter only. When using majority voting, counter A is actually set to 2 and counter B to 10 since one period is lost to signal processing, but, viewed macroscopically from outside, counters A, B are initialized to 1 and 9, respectively.

The 8-fold oversampling used in FlexRay protocol specification 2.1 is retained. However, the method works well also with any other type of oversampling. N-fold oversampling (n#8) requires corresponding adjustments.

With the periodicity of eight sampling periods, an edge change may take place but is not mandatory (cf. FIG. 1 and associated description). First, the position of a potential edge change without stochastic or systematic influence of a jitter or some other asymmetrical delay is ascertained. This position is denoted by potential edge position (PEP). With the ideal bit sequence in FIG. 6, the edge changes always occur precisely at the PEPs, in particular PEP1-2, PEP3-4, PEP4-5, and PEP5-6. Because of asymmetrical delay times, as a result of the synchronization to the falling (and not to the rising) BSS edge, the nominal position of the rising potential edge change is influenced. Accordingly, in the real bit sequence in FIG. 6, the rising edge changes are shifted to advance or to delay relative to the PEPs. On the other hand, the falling edge changes are shifted to a clearly lesser degree since they are affected only by the EMC component of the asymmetrical delay. That is to say, with the exception of stochastic influences, discernible as EMC jitter, the asymmetrical delay times have only a negligible effect on the actual position of the falling potential edge changes.

At 8-fold oversampling, a potential edge change is sampled maximally 8 sampling cycles prior to and maximally 8 sampling cycles following the nominal position. This is denoted as a sequence of sampling values. Of course, the sampling may also involve fewer than eight sampling cycles prior to and/or following the nominal position of a potential edge change.

Figure 2:
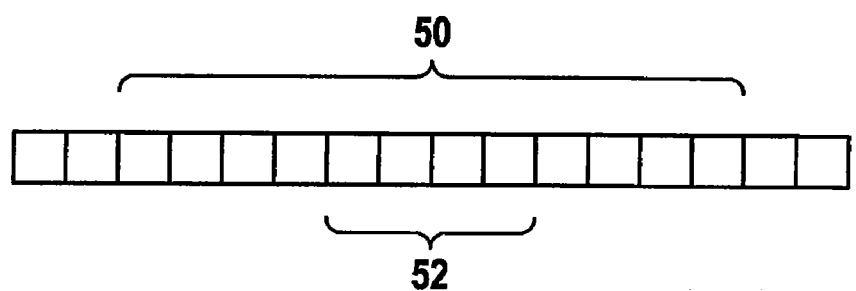
FIG. 2 illustrates sensitivity ranges for expected rising and falling edges.

A range in a sequence of successive sampling values in which a check is performed for an actual edge change (shifted from the nominal position by asymmetrical delay times and EMC jitter), is denoted as sensitivity range. It is shown in FIG. 2 of this patent application. Sensitivity range 50 for a rising edge lies in an interval between six sampling periods before and six sampling periods after the nominal PEP. Sensitivity range 52 of a falling edge lies in the interval between two sampling periods before and two sampling periods after the nominal PEP. Of course, in particular in oversampling other than the 8-fold oversampling, both sensitivity range 50, 52 for a rising edge and that for a falling edge could also include an interval having more or fewer sampling periods than indicated prior to and/or following the nominal PEP. Sampling values outside of sensitivity range 50, 52 are not considered.

An ordered combination of 16 sampling values of a potential edge change is denoted as edge-acceptance vector (EAV). There are a plurality of EAVs for one type of edge (rising or falling). FIGS. 3a and 3b illustrate different EAVs one underneath the other for rising edges by way of example, the left occurring first chronologically. The bit ('1') inverse relative to the preceding bit ('0') must be included at least once in an EAV. As a result, an EAV consisting exclusively of zeroes is not allowed. The 'X' at the beginning and the end of the EAVs result from the fact that sampling values outside of the sensitivity range are unimportant for the evaluation.

In order to reduce the number of the EAVs to be compared with the recorded sampling values and thus to save resources and time for the evaluation, a subset is selected from the EAVs, shown in FIGS. 3a and 3b, respectively, for the detection of a rising edge, which allows the detection and assignment of a rising edge to its PEP in an unambiguous manner. By measuring the delay of one or a plurality of changes, either required in the protocol or occurring randomly, from rising and falling edge, the trend of the systemic components of the asymmetrical delay (with the EMC influence uncertain) is advantageously determined. The EAVs utilized for the evaluation are selected such that they expect an edge change around the determined tendential position. In particular in the decoding of successive zeroes, the selected subset must ensure that there will be no potential ambiguity in the edge detection. There would be ambiguity if a detected rising edge could be shifted both from the PEP(i) to retard and from the PEP(i+1) to advance, and two EAVs would apply (one at BEW(i) and one at BEW(i+1)). The difference between FSS (frame start sequence) and BSS, for instance, could be utilized as change between rising and falling edge required in the protocol.

Figure 4B:
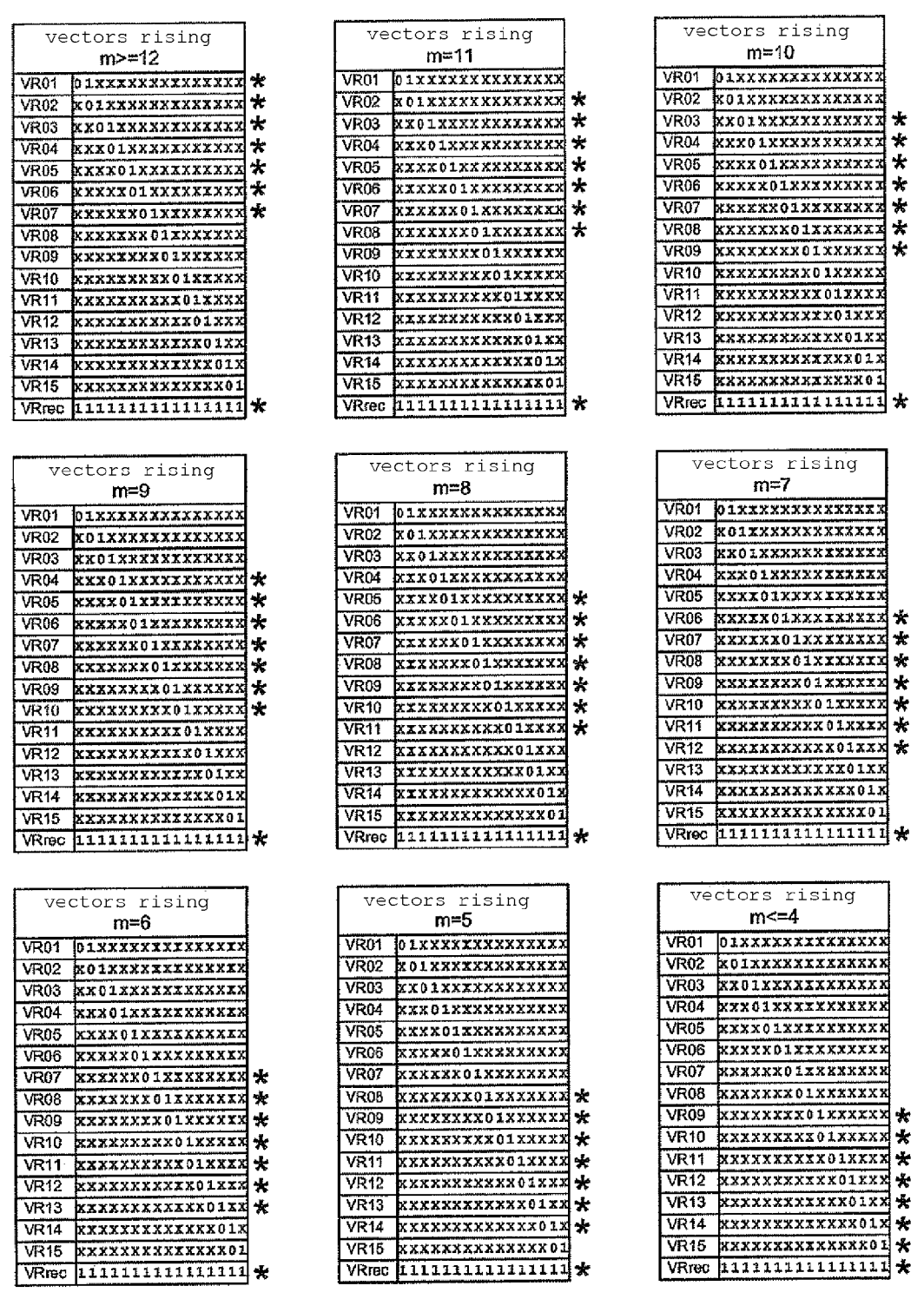

In FIGS. 4a and 4b, such subsets of the EAVs from FIGS. 3a and 3b are shown by way of example. Let it be assumed that the measuring results in an expected edge change at sampling period position 4 before PEP. An edge change from '0' to '1' at position 4 before PEP is detected by the third EAV from the subset of EAVs in FIG. 3a. Thus, this EAV is definitely part of the selected subset. In order to then allow a detection of the edge change about the determined trend with sufficient assurance and reliability, starting from the third EAV from FIG. 3a, a particular number of EAVs before the third EAV and a specific number of EAVs after the third EAV is incorporated in the subset. In the exemplary embodiment shown in FIG. 4a, starting from the third EAV, two EAVs before and two EAVs after the third EAV were incorporated in the subset, so that the set of edge-acceptance vectors for rising edges includes a total of five EAVs. Of course, the present invention is not limited to this number of EAVs as set of edge-acceptance vectors. In this exemplary embodiment, the EMC influence on the asymmetrical delay must thus not be greater than two sampling periods, i.e., approximately 25 ns. The vectors of the subsets selected as a function of m selected vectors of the subsets are marked by an asterisk "*" in FIG. 4b.

FIGS. 5a and 5b show EAVs for falling edges by way of example, the left being first chronologically. Since the sensitivity range includes only two sampling periods before and two sampling periods after the nominal PEP and all other measuring values are unimportant for the evaluation, only four EAVs result in this example. The bit ('0') inverse relative to the preceding bit ('1') must be included at least once in an EAV. A vector consisting exclusively of ones is therefore not allowed.

Figure 13:
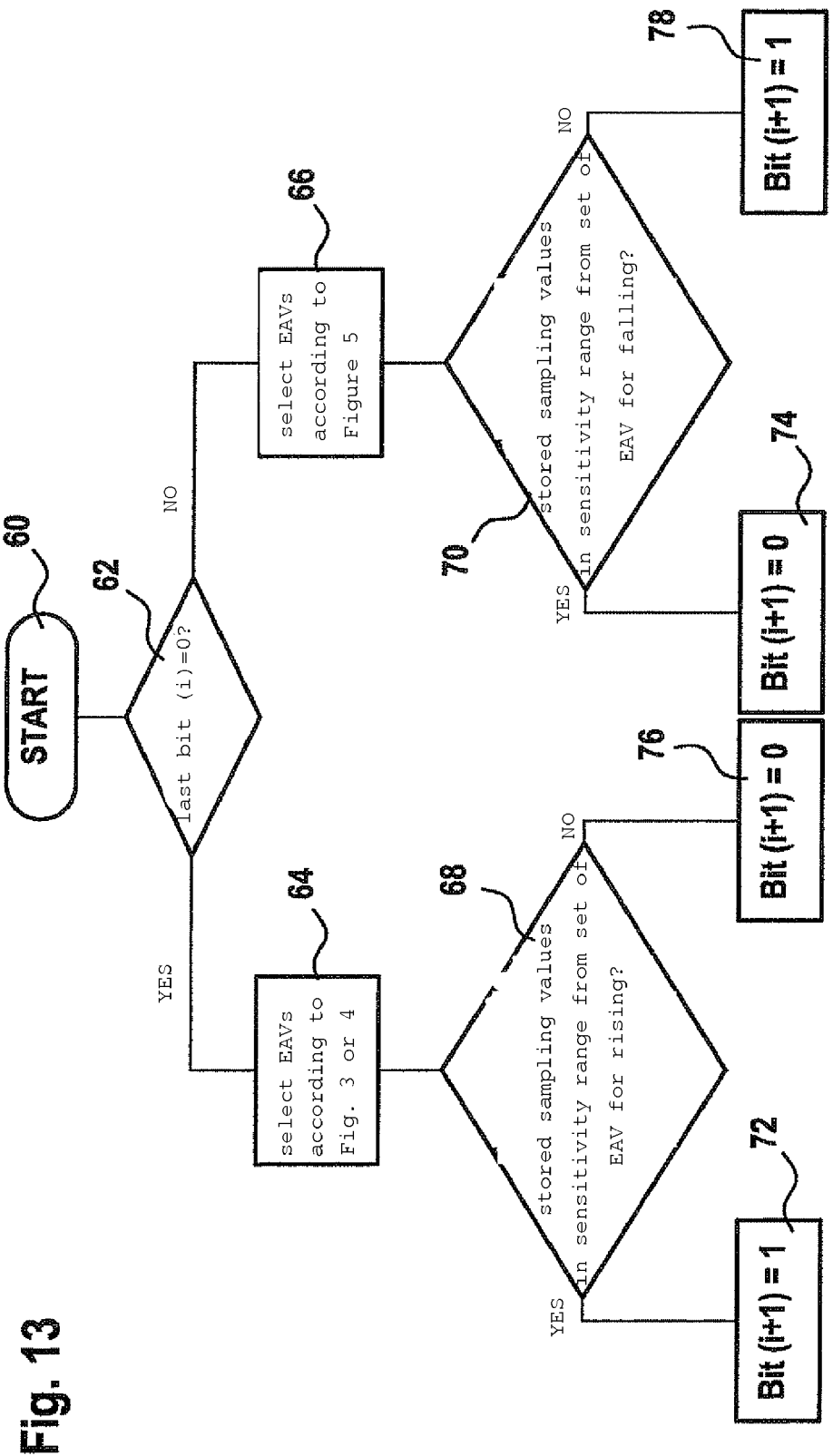
FIG. 13 is a flow chart illustrating a method of an example embodiment of the present invention.

FIG. 13 shows a flow chart of the method according to an example embodiment of the present invention. Bits arriving first are sampled first within the scope of the sampling or decoding. The method begins in a functional block 60. Prior to sampling a bit, the potential following edge (cf. FIG. 1) is specified on the basis of the detected value of the previously sampled bit (i). For this purpose, a query block 62 is provided, from which branching to a functional block 64 takes place in the case of an expected rising edge, and to a functional block 66 in the case of a falling edge. If the last bit was a '0', then the applicable edge acceptance vector set according to FIG. 4 (or FIG. 3) is to be selected. If the last bit was a '1', then the applicable edge acceptance vector set according to FIG. 5 is to be selected. Due to this specification, the corresponding edge acceptance vector set is determined. As obvious modification, in reversing this sequence, it is also possible to first detect an edge and then to determine the following bit value based on knowledge of the preceding data bit value.

Figure 7:
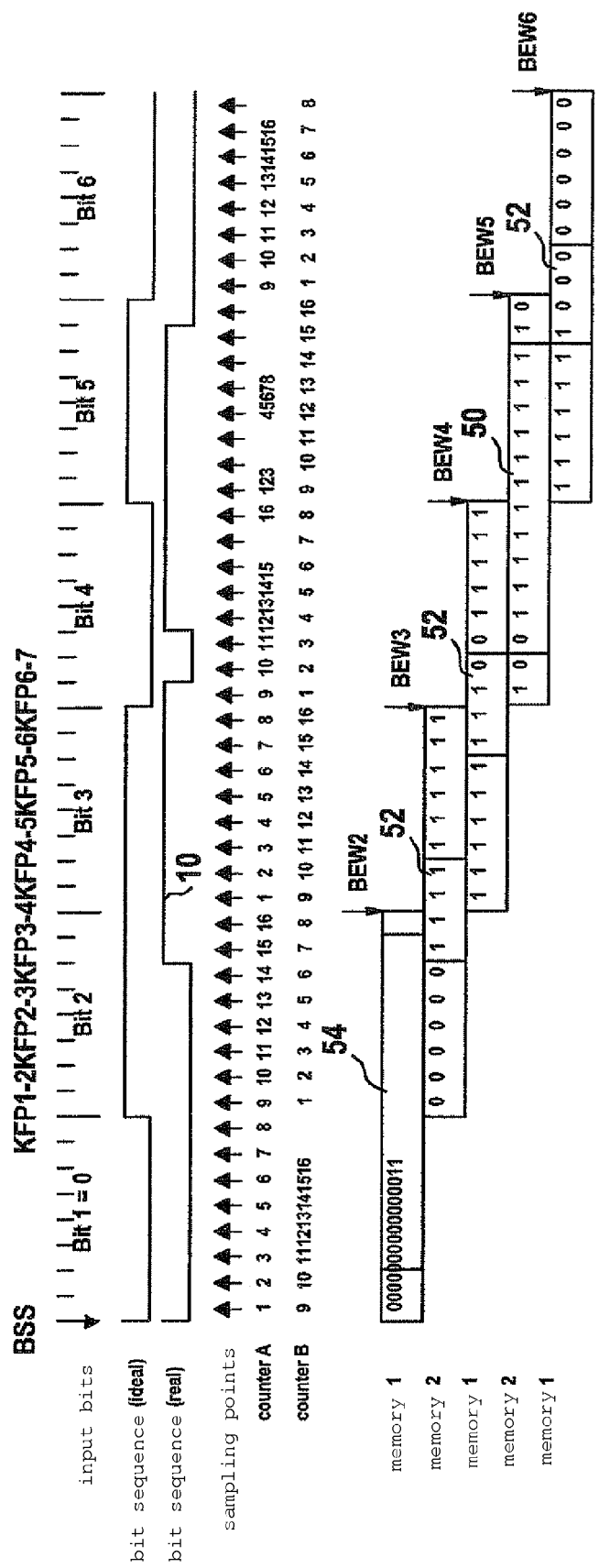
FIG. 7 illustrates a second example for the realization of the method according to an example embodiment of the present invention for a second exemplary bit sequence.

Whenever 16 sampling values are present (in 8-fold oversampling), an evaluation takes place at instant BEW in a functional block 68 or 70. In the exemplary embodiment from FIG. 6, for example, the value of bit #2 is determined at instant BEW2. In an advantageous manner, the evaluation may be implemented even before reaching the limit of sensitivity range 50, 52, since the evaluation of the "X" is not relevant. If it is determined within the framework of the evaluation that one of the stored EAVs that is part of the set of the selected edge acceptance vector set, then the associated edge is considered detected and the associated bit value is determined (cf. functional block 72 and 74). Otherwise no edge is detected, and the instantaneous bit is the same as the preceding bit (cf. functional block 76 and 78). FIG. 7 shows a simple variant of an example embodiment of the present invention. Sensitivity range 54 for expected rising edges includes not 12 but even 13 sampling values. This makes it possible to detect a rising edge change even at position 2 in front of PEP2-3, which would no longer be possible with a sensitivity range 50 from FIG. 6. The expansion of sensitivity range 54 by one sampling value is possible despite overlapping sensitivity ranges 52, 54, without endangering the unambiguity of the detection.

Figure 8:
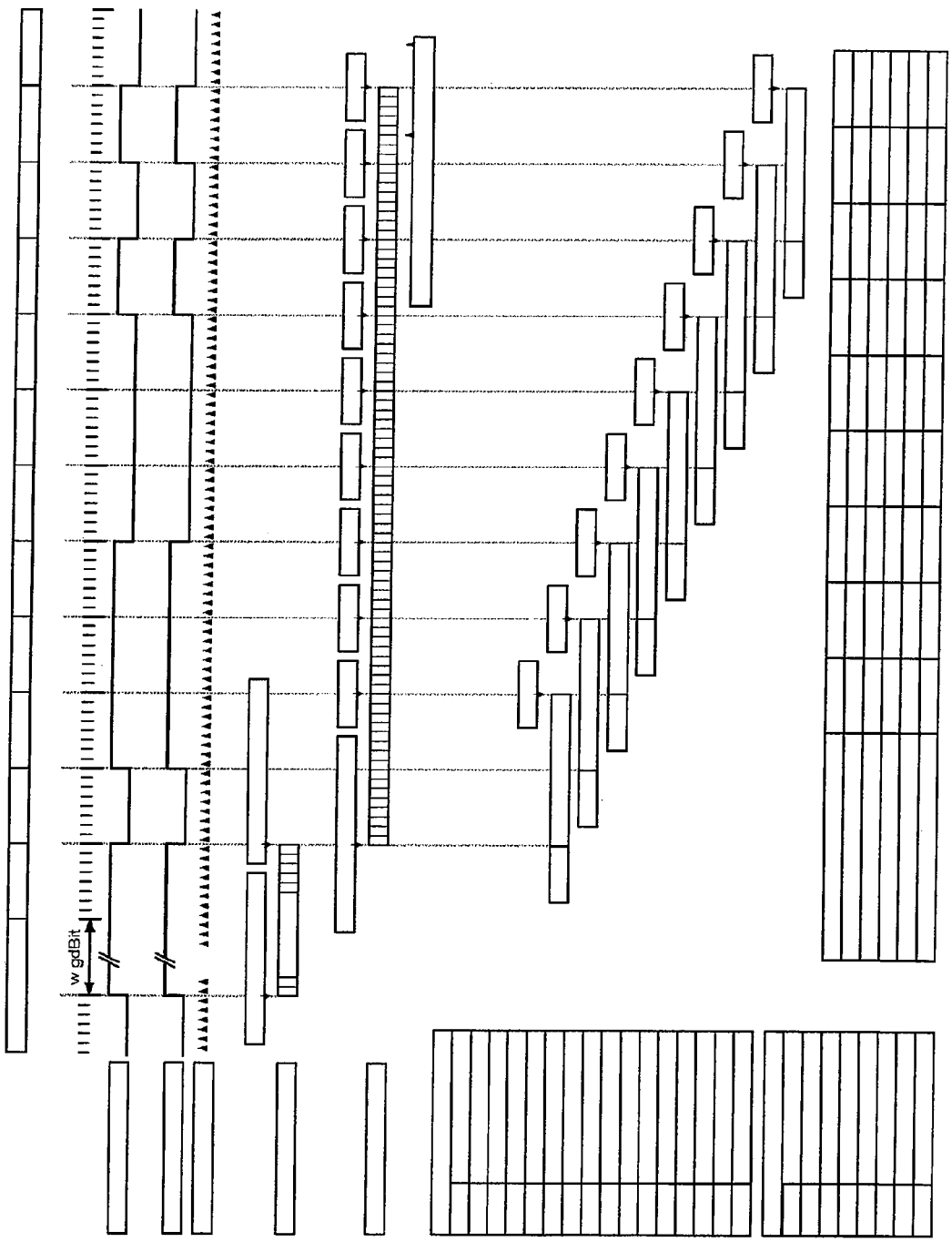
FIG. 8 illustrates a third example for the realization of the method according to an example embodiment of the present invention for a third exemplary bit sequence.

An additional exemplary embodiment is described in FIG. 8. In this example it is initially assumed in FIG. 8 that no asymmetrical delay by the transmission channel exists. For that reason, the signal "TxD data signal" (812) transmitted by a transmitting user (14) corresponds to signal "RxD data signal" (813) arriving at receiving user (36). To simplify the representation, only the asymmetrical delay times are generally shown in the examples; delays in topology run-through are disregarded in the figure since they are not relevant. For that reason, the edges of signal characteristics 812 and 812 are exactly superposed. Potential-edge positions PEP are to be understood according to the explanations regarding FIG. 6. Received data signal 813 is sampled periodically at sampling points 816. The description begins with resynchronization 802 of sampling counter 801. At this instant, a suitable subset of the rising edge-acceptance vectors 803 has already been selected. The edge-acceptance vectors in this exemplary embodiment have a different characteristic than those from FIGS. 3a, 4a, and 5a. The edge-acceptance vectors utilized here are shown in FIGS. 3b, 4b, and 5b. However, here too, the rule is basically satisfied that vectors for detecting rising edges must have at least one "1", and vectors for detecting falling edges must have at least one "0". Sampling counter 801 is incremented until it reaches 16. 16 is followed by 1 again, etc. When counter reading 16 is reached, input register RegA (804) will be filled with 16 consecutive sampling values, and the decision algorithm is carried out for evaluation point BEW1 (805). The interim results are listed in table 815 in the lower part of FIG. 8 in the column assigned to each individual evaluation point. Since the value of the last data bit was zero (BSS=0), only a rising edge is possible. For that reason the edge sensitivity is set to "rising". This means that the content of input register RegA (804) is compared to the selected subset of the rising edge-acceptance vectors. Which one of the rising edge-acceptance vectors was selected is shown by asterisk "*" behind the vector identification. Each edge-acceptance vector has an identification, such as "VR01" through "VR15" etc. The comparison of each vector of the selected subset to the content of input register RegA (804) has the result that vector "VR08" corresponds to the content of RegA (804). This means that a rising edge was detected and that the value of the decoded data bit 1 is therefore a "1". Eight sampling periods later, the other result register RegB (807) is full, and the decision algorithm is implemented for evaluation point BEW2 (806). Here it is basically possible that a falling edge occurs since the last data value was a "1". However, in this example from FIG. 8, none of the falling edge-acceptance vectors agrees with the content of RegB (807) at BEW2 (807). Therefore, no edge is detected, and the value of data bit 2 is "1". Evaluation point BEW3 (808) leads to the same sequence; the result for data bit 3 is "1" in this case as well. In evaluation point BEW4 (809), a falling edge is detected since the content of input register RegB (807) corresponds to falling edge-acceptance vector VF04. For the decoding of eight successive data bits, as provided in FlexRay protocol version v2.1, the decision algorithm must be executed eight times. This is carried out in evaluation points BEW1 (805) through BEW8 (810). An additional execution at BEW9 (811) is optional because the result must always be "1" for BSS=1. BEW9 (811) may be used for plausibility checks. To detect the next BSS edge, the BSS detection is activated (814). This may be carried out, for example, by methods published in the FlexRay specification version 2.1 and functioning accordingly.

Figure 11:
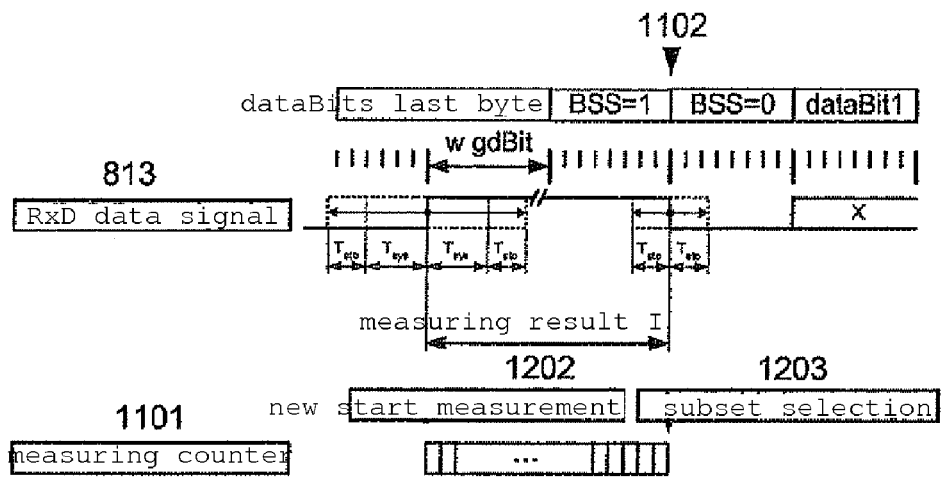
FIG. 11 illustrates a first example for the realization of the method according to an example embodiment of the present invention for measuring the delay of rising and falling edge.
Figure 12:
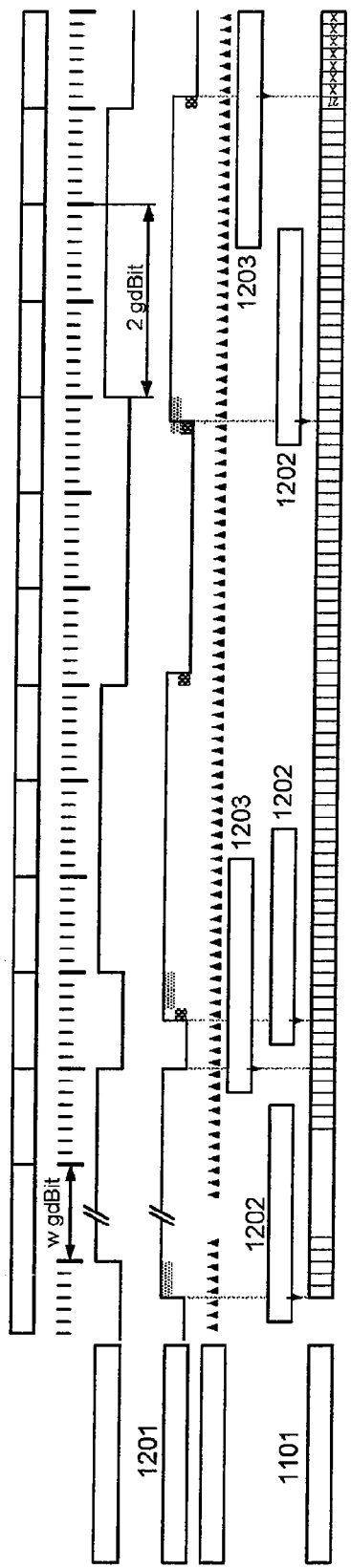
FIG. 12 illustrates a second example for the realization of the method according to an example embodiment of the present invention for measuring the delay of rising and falling edge.

One advantageous development of the selection of a suitable subset by measuring successive rising and falling edges is described in FIG. 11. The number of sampling cycles between a rising and a falling edge, or also a plurality of rising and falling edges, is basically determined via a counter (1101). In the example, the interval of the falling BSS edge relative to the last preceding rising edge is measured for each synchronization point BSS (1102). Let's denote the measuring result by i. Prior to BSS=1, precisely w data bits are identical to "1". For the selection of the vector subset, parameter m is determined according to the formula m=i−8w. The subset of the vectors is selected for instance according to FIG. 4b as a function of m. Given eightfold oversampling, the maximum number of vectors of the subset is 7 in order to ensure an unambiguous decoding. Eight vectors would theoretically be possible as well, but this would lead to a non-symmetrical distribution of the tolerances. Nevertheless, this would increase the robustness of the decoding. A measuring process is shown in FIG. 12 by way of example. Here, each rising edge is shifted to "advance" by three sampling periods relative to the falling BSS edge by systematic, asymmetrical delay times. An additional stochastic jitter by one sampling period leads to received signal "RxD data signal" (1201). The measuring counter is started (that is, begins to increment from 1) at the first rising edge after the BSS edge (1202). The measuring counter is incremented in each sampling period until a falling edge is detected. The state of the measuring counter remains undefined (logically "X") until the next rising edge occurs. The measurement is started at counter reading "1" at the next rising edge (1202). In FIG. 12, two data bits having value "1" are before BSS=1, so that w is set to 2 in this example.

The final reading of the measuring counter is i=27. As a result, m is calculated for m=i−8w=27−16=11. Consequently, the subset according to the table having heading m=11 is to be selected from FIG. 4b. The selection of the subset occurs in response to the detection of the falling BSS edge (1203).

Figure 9:
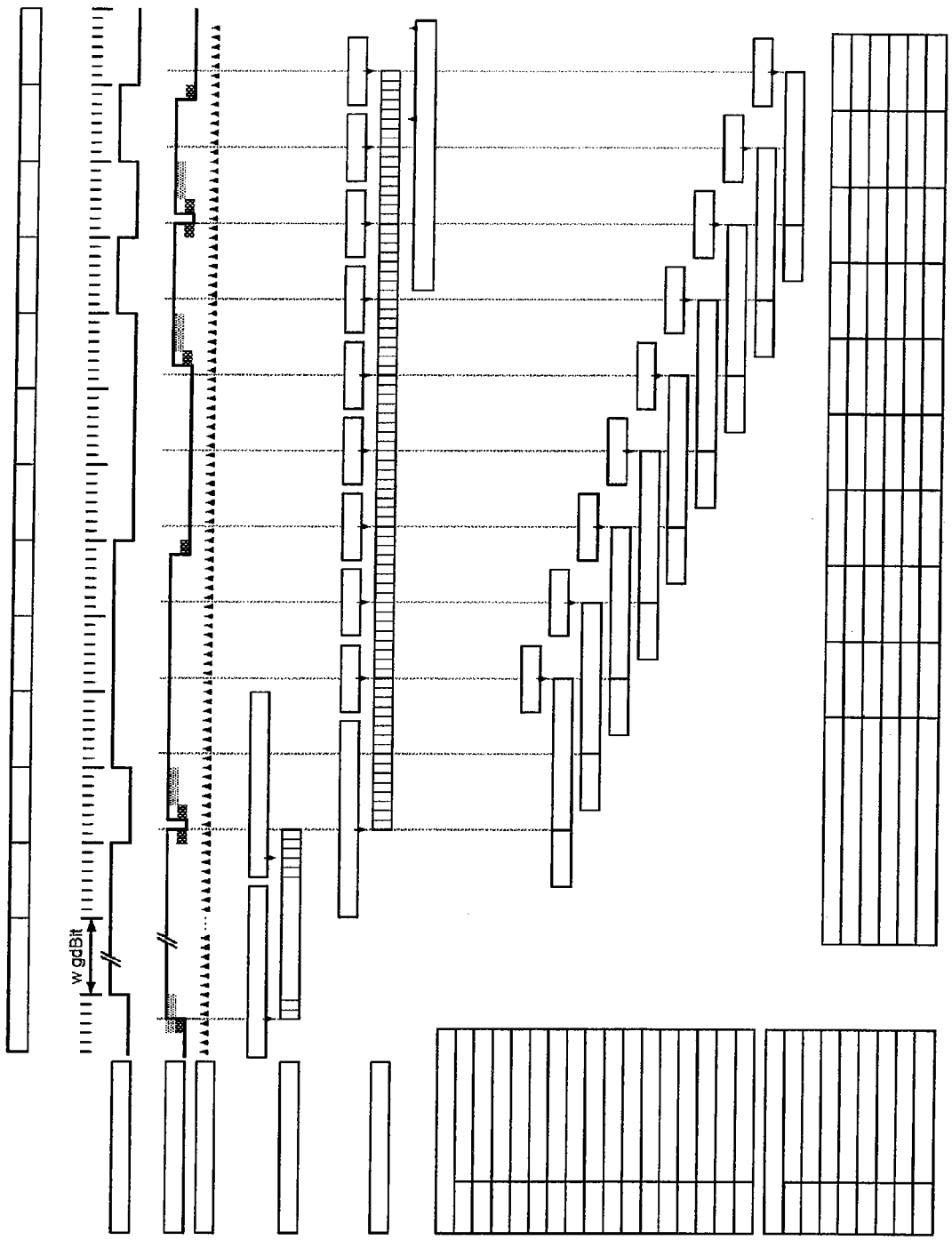
FIG. 9 illustrates a fourth example for the realization of the method according to an example embodiment of the present invention for a fourth exemplary bit sequence.
Figure 10:
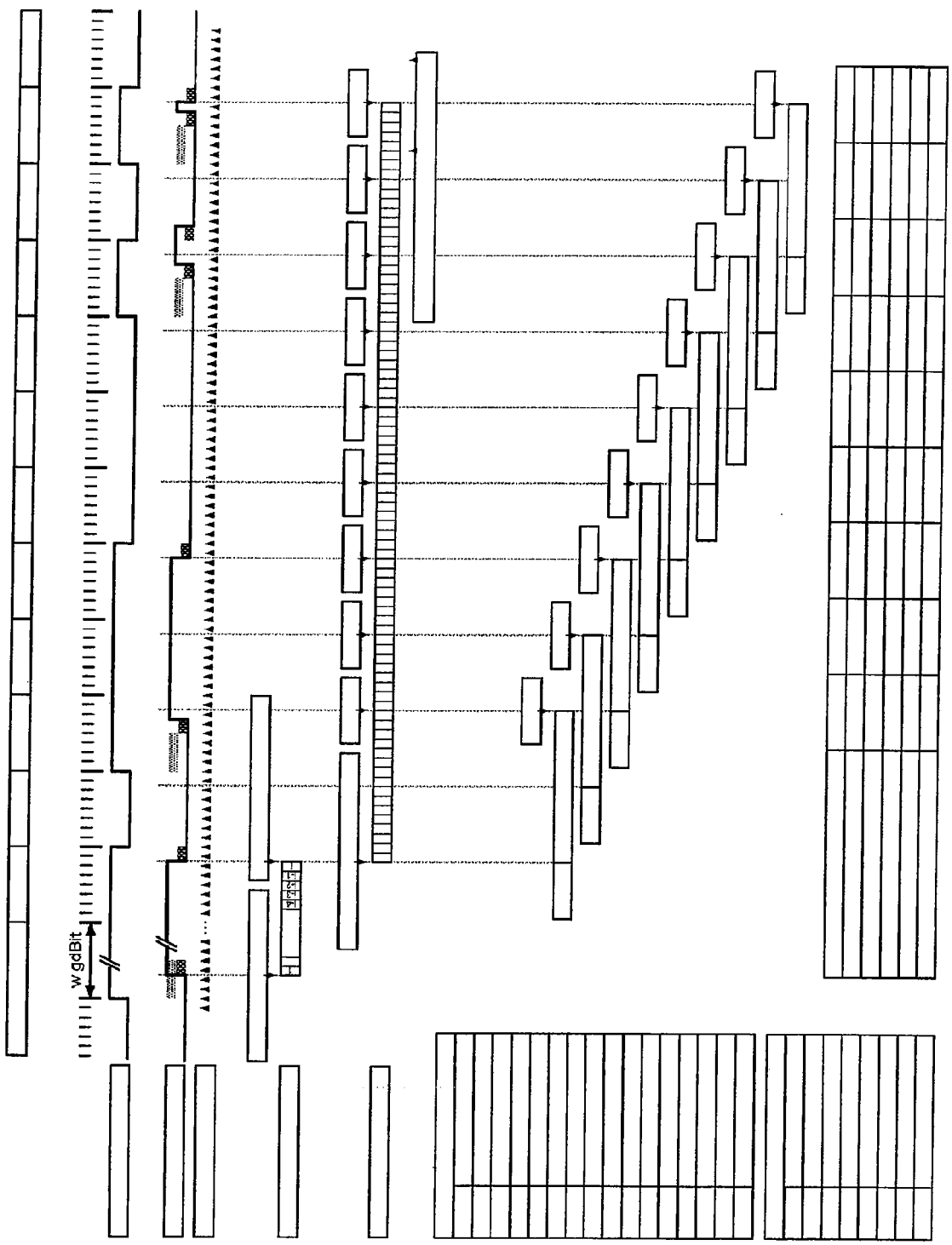
FIG. 10 illustrates a fifth example for the realization of the method according to an example embodiment of the present invention for a fifth exemplary bit sequence.

For further illustration, FIG. 9 shows a decoding example having a maximum asymmetry to "advance", and FIG. 10 shows a maximum asymmetry to "delay". In these figures, the static (=systematic) asymmetry 901 is acting on the falling edge by shifting the rising edges with respect to the falling, whereas stochastic asymmetry 902 is additionally acting on each edge.

In the event of brief interruptions on the signal line, additional vectors "VRrec" and "VFrec" allow the decoder to resume correct operation following short-duration incorrect decoding. Although this does not allow errors to be avoided or corrected, it is nevertheless ensured that the Hamming distance, which is decisive for error detection, will not be exceeded. The vectors "VRrec" and "VFrec" also may show less significant "1" or "0" than shown in the example.

According to example embodiments of the present invention, a communications controller advantageously includes two memories, preferably two 16 bit memories, which are written to in alternation. The storing is triggered by the two counters A and B with value range 16, which are incremented at each sampling cycle (sampling period). A memory is written to by the first sampling bit of the potential edge change sampling if the associated counter A, B is at '1', etc. However, smaller memories that allow comparisons in short segments including at least one bit are possible as well.

The method of example embodiments of the present invention may be simplified and accelerated by the definition of and compliance with marginal conditions. The sum of the sample clocks must not exceed 16 for two successive sensitivity ranges (given eightfold oversampling). The filter effect of the majority voting machine must be taken into account. In determining the maximally allowed time budget for the asymmetrical delay times, the time discretization error of the sampling is to be taken into account. In particular, the EAV that includes exclusively '0' or '1' in the sensitivity range is used to compensate for the time-discretization error. In the example from FIG. 8, at least the following asymmetrical overall delays are allowed when exhausting all EAVs:

+/−7 sampling periods for the difference of falling to rising edge (that is, max. 87.5 ns at 12.5 ns sampling period duration)

+/−3 sampling periods for the difference of falling to falling edge (that is, 37.5 ns)

Some of the possible variants are listed in the following text by way of example: Instead of evaluating vectors (which may correspond to combinatorics), the edge changes may also be detected in some other manner, the position of the detected changes being ascertained with reference to the counter reading of counters A, B. The position allows the evaluation of the instantaneous bit value. The magnitudes of sensitivity ranges 50, 52, 54 are variable. Instead of an eightfold oversampling, some other n-fold oversampling may be selected. Instead of a synchronization to the falling edge, it may also be synchronized to the rising edge. The number of bits to be sampled after the synchronization edge may be varied. The evaluation of the sampled values allows the diagnosis of implausible combinations as input bit errors (such as oscillating input bit streams). Evaluation instant BEW need not necessarily occur after 16 monitored sampling values, but following the end of the sensitivity of the evaluation since the evaluation of the sampling values outside the sensitivity range is irrelevant. Majority voting requires a minimum duration of the 1 or 0 phase of two sampling period durations. As an alternative, the majority voting may also be reduced to two consecutive edges (rising and falling) of the sampling period, or a filter effect may be achieved as well by suitable selection of the edge-acceptance vectors.

What is claimed is:

1. A method for decoding a signal, comprising:
transmitting the signal via at least one connection line of a data transmission system;
receiving, in a user of the data transmission system, the signal, encoded data being transmitted in data frames in the signal;
transmitting the data serially in a bit-by-bit manner;
sampling each bit over a plurality of cycles in the receiving user;
specifying synchronization points within a data frame for referencing a sampling for each received bit;
determining a position for a potential edge change without consideration of asymmetrical delays of the signal available at the receiving user;
sampling an applied signal for a potential edge change at least one of (a) at least one sampling period prior to the position for a potential edge change and (b) at least one sampling period after the position for a potential edge change;
comparing the sampled values of the applied signal with corresponding values previously determined and stored; and
determining the value of a bit received between two potential edge changes as a function of a result of the comparison.

2. The method according to claim 1, wherein the sampled values of the applied signal are compared in segments of any size including at least one bit, to values that were previously determined and stored.

3. The method according to claim 1, wherein the previously determined sampling values are stored in an orderly sequence in at least one memory.

4. The method according to claim 1, wherein an edge-acceptance vector in an n-fold oversampling of the applied signal includes maximally 2n sampling values.

5. The method according to claim 3, wherein in edge-acceptance vectors for rising edges, at least one bit value corresponds to a one.

6. The method according to claim 3, wherein in edge-acceptance vectors for falling edges, at least one bit value corresponds to a zero.

7. The method according to claim 1, wherein the applied signal in an n-fold oversampling is sampled in a sensitivity range that includes maximally n sampling periods before the position for a potential edge change, and maximally n sampling periods after the position for a potential edge change.

8. The method according to claim 6, wherein, starting from an instantaneous bit value, the potential directions of the edge change in a transition to a following bit value are determined, and depending on whether a rising or a falling edge is expected, the sampled values from the sampling range are compared to different edge-acceptance vectors.

9. The method according to claim 1, wherein at least one of (a) a delay of at least one change required in a transmission protocol used in the data transmission system and (b) and/or a randomly occurring change from rising to falling edge is measured and a trend of the asymmetrical delay is determined therefrom.

10. The method according to claim 1, wherein at least one of (a) a delay of at least one change required in a transmission protocol used in the data transmission system and (b) a randomly occurring change from falling to rising edge is measured and a trend of the asymmetrical delay is determined therefrom.

11. The method according to claim 9, wherein a measurement for more than one synchronization point is implemented at least once.

12. The method according to claim 11, wherein, using a same phase reference between sampling cycle and applied signal, measuring and decoding are implemented.

13. The method according to claim 9, wherein only a subset of all edge-acceptance vectors is used to evaluate a bit value, and the subset is selected such that a detection of an edge change about the determined tendential position is possible with the aid of the edge-acceptance vectors available in the subset.

14. The method according to claim 2, wherein the stored sampling values are compared with previously determined and stored values, and a plausibility of the sampled values is evaluated as a function of the result.

15. A method for decoding a signal, comprising:
transmitting the signal via at least one connection line of a data transmission system;
in a user of the data transmission system receiving the signal, encoded data being transmitted in the signal;
transmitting the data serially in a bit-by-bit manner;
sampling each bit in the receiving user over a plurality of cycles;
specifying synchronization points within a data frame for referencing to a sampling for each received bit;
comparing the sampled values of the applied signal to corresponding values previously determined and stored; and
determining an edge change from the comparing.

16. The method according to claim 15, wherein the sampled values of the applied signal are compared in segments of any size including at least one bit, to values that were previously determined and stored.

17. The method according to claim 16, wherein the previously determined sampling values are stored in an orderly sequence in at least one memory.

18. The method according to claim 17, wherein a detected edge change is related to a reading of a counter referenced to at least one synchronization point, and a value of a bit received between two potential edge changes is determined as a function of an evaluation of the position of an edge change.

19. The method according to claim 18, wherein, starting from an instantaneous bit value, it is determined in which bit value the detected edge change has resulted.

20. The method according to claim 15, wherein a delay of at least one change from rising to falling edge required in a transmission protocol used in the data transmission system is measured, and a trend of an asymmetrical delay is determined therefrom.

21. The method according to claim 15, wherein a delay of at least one change from falling to rising edge required in a transmission protocol used in the data transmission system is measured, and a trend of an asymmetrical delay is determined therefrom.

22. The method according to claim 20, wherein a measurement for each synchronization point is implemented at least once.

23. The method according to claim 22, wherein measuring and decoding are implemented using a same phase reference between sampling period and applied signal.

24. The method according to claim 21, wherein, to determine a bit value, only a subrange of a value range of a counter referenced to a status of at least one synchronization point is used, and the subrange is selected such that a detection of an edge change about a determined tendential position is possible with the aid of a time range covered in the subrange.

25. The method according to claim 16, wherein the stored sampling values are compared with previously determined and stored values, and a plausibility of the sampled values is evaluated as a function of the result.

26. A system for transmitting data, comprising:
a plurality of users having connection lines between the users;
a device configured to transmit the data in data frames;
a transmission device configured to transmit the data serially in a bit-by-bit manner;
a device configured to sample each bit over a multitude of cycles in a user receiving data;
a device configured to specify synchronization points within a data frame for referencing a sampling for each received bit;
a decoding device configured to determine a position for a potential edge change without taking into account asymmetrical delays of a signal transmitted via at least one of the connection lines connected to the user;
a device configured to sample the signal at least one of (a) at least one sampling period before the position for a potential edge change and (b) at least one sampling period after the position for a potential edge change;
a device configured to compare the sampled values of the signal to corresponding values previously determined and stored; and
a device configured to determine a value of a bit received between two potential edge changes as a function of the comparison.

27. A user of a data transmission system, comprising:
a device configured to transmit the data in data frames;
a device configured to transmit the data serially in a bit-by-bit manner;
a device configured to sample each bit over a multitude of cycles;
a device configured to specify synchronization points within a data frame for referencing a sampling for each received bit; and
a device configured to determine a position for a potential edge change without taking into account asymmetrical delays of a signal transmitted via at least one of the connection lines connected to the user, to sample the signal at least one of (a) at least one sampling period before the position for a potential edge change and (b) at least one sampling period after the position for a potential edge change, to compare the sampled values of the signal to corresponding values previously determined and stored, and to determine a value of a bit received between two potential edge changes as a function of a result of the comparison.

28. The user according to claim 27, further comprising at least one of (a) a memory, (b) a memory area, and (c) a register configured to store at least one of (a) the sampled values of a sensitivity range and (b) the previously determined values of edge-acceptance vectors.

29. The user according to claim 27, further comprising a logic circuit, configured to compare the sampled values of a sensitivity range to previously determined values of edge-acceptance vectors.

30. The user according to claim 27, further comprising at least one of (a) a control system and (b) a finite automaton configured to control a determination of the position for the potential edge changes of the applied signal, the sampling of the applied signal, the comparison of the sampled values of a sensitivity range to previously determined and stored values of edge-acceptance vectors, and the determination of the received bits.

31. The user according to claim 27, further comprising a counter configured to produce a time reference to at least one synchronization point.

32. The user according to claim 27, further comprising at least one of (a) a control system and (b) a finite automaton, and a logic circuit, in order to control the evaluation of the sampled values for plausibility.

33. The user according to claim 27, further comprising at least one of (a) a control system and (b) a finite automaton, and a logic circuit, in order to synchronize a counter to a synchronization point.

34. The user according to claim 27, further comprising at least one of (a) at least one register and (b) at least one memory in order to store a result of a plausibility check.

35. The user according to claim 27, further comprising a logic circuit in order to detect an edge change from the sampled values of the transmitted signal.

36. A communications controller of a user of a data transmission system, comprising:
a device configured to transmit the data in data frames and to transmit the data serially in a bit-by-bit manner;
a device configured to sample each bit over a multitude of cycles;
a device configured to specify synchronization points within a data frame for referencing a sampling for each received bit; and
a device configured to determine a position for a potential edge change without taking into account asymmetrical delays of a signal, which is transmitted via at least one connection line connected to the user, to sample the signal at least one of (a) at least one sampling period before the position for a potential edge change and (b) at least one sampling period after the position for a potential edge change, to compare the sampled values of the signal to corresponding values previously determined and stored, and to determine a value of a bit received between two potential edge changes as a function of a result of the comparison.

* * * * *